(12) United States Patent
Lian

(10) Patent No.: US 12,390,731 B2
(45) Date of Patent: Aug. 19, 2025

(54) POSITION PROMPT METHOD AND APPARATUS FOR VIRTUAL OBJECT, TERMINAL, AND STORAGE MEDIUM

(71) Applicant: TENCENT TECHNOLOGY (SHENZHEN) COMPANY LIMITED, Shenzhen (CN)

(72) Inventor: Jianfeng Lian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 266 days.

(21) Appl. No.: 18/314,379

(22) Filed: May 9, 2023

(65) Prior Publication Data

US 2023/0321539 A1 Oct. 12, 2023

Related U.S. Application Data

(63) Continuation of application No. PCT/CN2022/091765, filed on May 9, 2022.

(30) Foreign Application Priority Data

Jun. 3, 2021 (CN) .......................... 202110620718.0

(51) Int. Cl.
*A63F 13/5378* (2014.01)
*A63F 13/533* (2014.01)
(Continued)

(52) U.S. Cl.
CPC ........ *A63F 13/533* (2014.09); *A63F 13/5372* (2014.09); *A63F 13/5378* (2014.09); *G06F 3/0486* (2013.01)

(58) Field of Classification Search
CPC ........ A63F 13/20; A63F 13/40; A63F 13/426; A63F 13/45; A63F 13/52; A63F 13/533;
(Continued)

(56) References Cited

U.S. PATENT DOCUMENTS

| 10,716,997 | B2 | 7/2020 | He |
| 2018/0028907 | A1 | 2/2018 | Weng et al. |

(Continued)

FOREIGN PATENT DOCUMENTS

| CN | 107741818 A | 2/2018 |
| CN | 107992252 A | 5/2018 |

(Continued)

OTHER PUBLICATIONS

China National Intellectual Property Administration (CNIPA) Office Action 1 for 202110620718.0 Oct. 20, 2022 13 Pages (including translation).

(Continued)

*Primary Examiner* — Omkar A Deodhar
(74) *Attorney, Agent, or Firm* — ANOVA LAW GROUP, PLLC

(57) ABSTRACT

Embodiments of the present disclosure provide a position prompt method and apparatus for virtual objects. The method includes displaying a virtual environment map and an object identifier corresponding to a first virtual object, the first virtual object and the controlled virtual object belonging to different camps; and in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

20 Claims, 12 Drawing Sheets

(51) Int. Cl.
*A63F 13/5372* (2014.01)
*G06F 3/0486* (2013.01)

(58) Field of Classification Search
CPC ............... A63F 13/5372; A63F 13/537; A63F 13/5378; A63F 2300/30; A63F 2300/306; A63F 2300/307; G06F 3/0486
See application file for complete search history.

(56) References Cited

U.S. PATENT DOCUMENTS

| | | | |
|---|---|---|---|
| 2019/0076739 A1* | 3/2019 | Ge | A63F 13/537 |
| 2019/0258374 A1* | 8/2019 | Zhang | G06F 16/9537 |
| 2019/0366212 A1* | 12/2019 | Kusakihara | A63F 13/426 |
| 2020/0293154 A1 | 9/2020 | Qiu et al. | |
| 2021/0216181 A1* | 7/2021 | Zhang | G06F 16/9537 |
| 2021/0245054 A1* | 8/2021 | Lee | A63F 13/80 |
| 2021/0326027 A1* | 10/2021 | Wang | A63F 13/42 |
| 2021/0331070 A1 | 10/2021 | Song | |
| 2022/0047946 A1 | 2/2022 | Hu et al. | |
| 2022/0284077 A1* | 9/2022 | Dahl | G09B 29/106 |

FOREIGN PATENT DOCUMENTS

| | | |
|---|---|---|
| CN | 110368691 A | 10/2019 |
| CN | 111282266 A | 6/2020 |
| CN | 112346636 A | 2/2021 |
| CN | 112402962 A | 2/2021 |
| CN | 112791406 A | 5/2021 |
| CN | 112827170 A | 5/2021 |
| CN | 113198178 A | 8/2021 |
| JP | 2010053180 A | 3/2010 |
| JP | 2018057462 A | 4/2018 |
| JP | 2018519970 A | 7/2018 |
| JP | 2018166965 A | 11/2018 |
| JP | 2020028652 A | 2/2020 |
| KR | 20190131673 A | 11/2019 |
| KR | 20200087260 A | 7/2020 |
| WO | 2019179314 A1 | 9/2019 |
| WO | 2020244421 A1 | 12/2020 |

OTHER PUBLICATIONS

The World Intellectual Property Organization (WIPO) International Search Report for PCT/CN2022/091765 Aug. 22, 2022 13 Pages (including translation).
Qqtn."Tengniu Net""Strong and soft", Jul. 15, 2015 (Jul. 15, 2015).
The Japan Patent Office (JPO) Notice of Reasons for Refusal for Application No. 2023-559103 Dec. 23, 2024 17 Pages (including translation).
Korean Intellectual Property Office (KIPO) Office Action 1 for Application No. 2023-7028424 Mar. 19, 2025 10 Pages (including translation).

* cited by examiner

POSITION PROMPT METHOD AND APPARATUS FOR VIRTUAL OBJECT, TERMINAL, AND STORAGE MEDIUM

RELATED APPLICATIONS

This application is a continuation of PCT Application No. PCT/CN2022/091765, filed on May 9, 2022, which in turn claims priority to Chinese Patent Application No. 202110620718.0, entitled "POSITION PROMPT METHOD AND APPARATUS FOR VIRTUAL OBJECT, TERMINAL, AND STORAGE MEDIUM" filed on Jun. 3, 2021. The two applications are both incorporated herein by reference in their entirety.

FIELD OF THE TECHNOLOGY

Embodiments of this application relate to the field of human-computer interaction technologies, and in particular, to a position prompt method and apparatus for a virtual object, a terminal, and a storage medium.

BACKGROUND OF THE DISCLOSURE

Small maps are provided in many application programs in which virtual scenes are built (for example, a virtual reality application program, a three-dimensional map program, a military simulation program, a first-person shooting game, and a multiplayer online battle arena game), to display positions of users and the global environment.

When a user needs to warn teammates of an enemy player hidden at a certain position, bullet comments for warning can be triggered by clicking/tapping the position of the enemy player in a small map to warn the teammates to pay attention to the surrounding environment.

By adopting the position prompt method in the related art, only bullet comments for attention can be transmitted to the teammates, and the teammates cannot learn the identity of the specific hidden enemy player and the specific hidden position of the enemy player, leading to low efficiency and low accuracy of message processing.

SUMMARY

Embodiments of this application provide a position prompt method and apparatus for a virtual object, a terminal, and a storage medium. The technical solutions are as follows:

One aspect of this application provides a position prompt method for a virtual object, performed by a terminal. The method includes displaying a virtual environment map and an object identifier corresponding to a first virtual object, the first virtual object and the controlled virtual object belonging to different camps; and in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

Another aspect of this application provides a position prompt apparatus for a virtual object. The apparatus includes one or more processors and a memory, the memory storing at least one program, the at least one program being loaded and executed by the one or more processors to implement a position prompt method for a virtual object, the one or more processors controlling a controlled virtual object. The method includes displaying a virtual environment map and an object identifier corresponding to a first virtual object, the first virtual object and the controlled virtual object belonging to different camps; and in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

Another aspect of this application provides a computer-readable storage medium, storing at least one program, the at least one program being loaded and executed by a processor to implement the position prompt method for a virtual object described in the foregoing aspect.

In embodiments of this application, a function of marking the position of the target virtual object in the virtual environment map is provided. A user can drag the target object identifier to a specified position in the virtual environment map, and then transmit the position prompt message related to the target virtual object to other teammates by triggering the target object identifier, so that other teammates can obtain the target object position of the target virtual object based on the position prompt message, which enriches the way to obtaining position information of the target virtual object, and improves the effectiveness and accuracy of the obtained position message. In addition, when the virtual object adopts a hiding and guarding strategy, the position of the hidden virtual object can be marked in time, to improve the hit rate of the hidden virtual object, thereby speeding up the game process, effectively controlling the length of a single game, and reducing the processing pressure of the server.

DESCRIPTION OF EMBODIMENTS

Figure 1:
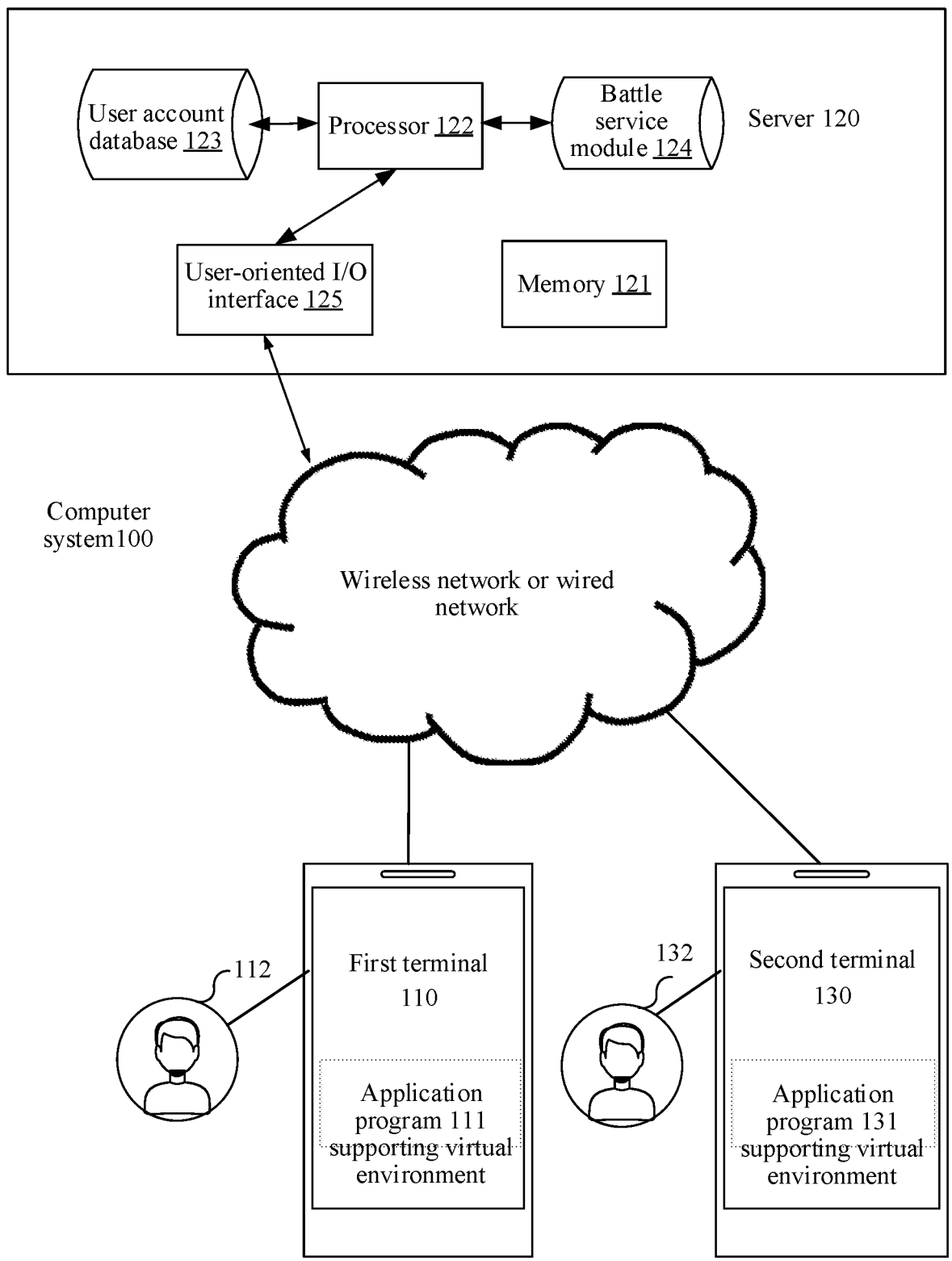
FIG. 1 is a schematic diagram of an implementation environment according to an embodiment of this application.

FIG. 1 is a schematic diagram of an implementation environment according to an embodiment of this application. The implementation environment may include: a first terminal 110, a server 120, and a second terminal 130.

An application program 111 supporting a virtual environment is run on the first terminal 110, and the application program 111 may be a multiplayer online battle program. When the first terminal runs the application program 111, a user interface of the application program 111 is displayed on a screen of the first terminal 110. The application program 111 may be any one of a multiplayer online battle arena (MOBA) game, a battle royale shooting game, or a simulation game (SLG). In this embodiment, an example in which the application program 111 is a MOBA game is used for description. The first terminal 110 is a terminal used by a first user 112. The first user 112 uses the first terminal 110 to control a first virtual object in the virtual environment to perform a movement, and the first virtual object may be referred to as a master control virtual object of the first user 112. The movement of the first virtual object includes, but is not limited to: at least one of adjusting body postures, crawling, walking, running, riding, flying, jumping, driving, picking, shooting, attacking, throwing, or skill casting. For example, the first virtual object is a first virtual character such as a simulated character or a cartoon character.

An application program 131 supporting a virtual environment is run on the second terminal 130, and the application program 131 may be a multiplayer online battle program. When the second terminal 130 runs the application program 131, a user interface of the application program 131 is displayed on a screen of the second terminal 130. The client may be any one of a MOBA game, a battle royale shooting game, or an SLG game. In this embodiment, an example in which the application program 131 is a MOBA game is used for description. The second terminal 130 is a terminal used by a second user 132. The second user 132 uses the second terminal 130 to control a second virtual object in the virtual environment to perform a movement, and the second virtual object may be referred to as a master virtual character of the second user 132. For example, the second virtual object is a second virtual character, such as a simulated character or a cartoon character.

In some embodiments, the first virtual object and the second virtual object are in the same virtual world. In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other.

In some embodiments, the application programs run on the first terminal 110 and the second terminal 130 are the same, or the application programs run on the two terminals are the same type of application programs in different operating system platforms (Android or IOS). The first terminal 110 may generally refer to one of a plurality of terminals, and the second terminal 130 may generally refer to another one of the plurality of terminals. In this embodiment, the first terminal 110 and the second terminal 130 are only used as an example for description. The device types of the first terminal 110 and the second terminal 130 are the same or different. The device types include: at least one of a smartphone, a tablet computer, an e-book reader, a moving picture experts group audio layer III (MP3) player, a moving picture experts group audio layer IV (MP4) player, a laptop computer, or a desktop computer.

FIG. 1 shows only two terminals. However, a plurality of other terminals may access the server 120 in different embodiments. In some embodiments, one or more terminals are terminals corresponding to a developer. A developing and editing platform for the application program supporting a virtual environment is installed on the terminal. The developer may edit and update the application program on the terminal and transmit an updated application program installation package to the server 120 by using a wired or wireless network. The first terminal 110 and the second terminal 130 may download the application program installation package from the server 120 to update the application program.

The first terminal 110, the second terminal 130, and another terminal is connected to the server 120 through a wireless network or a wired network.

The server 120 includes at least one of one server, a server cluster including a plurality of servers, a cloud computing platform, and a virtualization center. The server 120 is configured to provide a backend service for an application program supporting a three-dimensional virtual environment. In some embodiments, the server 120 is responsible for primary computing work, and the terminal is responsible for secondary computing work; or the server 120 is responsible for secondary computing work, and the terminal is responsible for primary computing work; or a distributed computing architecture is adopted between the server 120 and the terminal to perform collaborative computing.

In one embodiment, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 via a wireless network or a wired network for data exchange.

Figure 2:
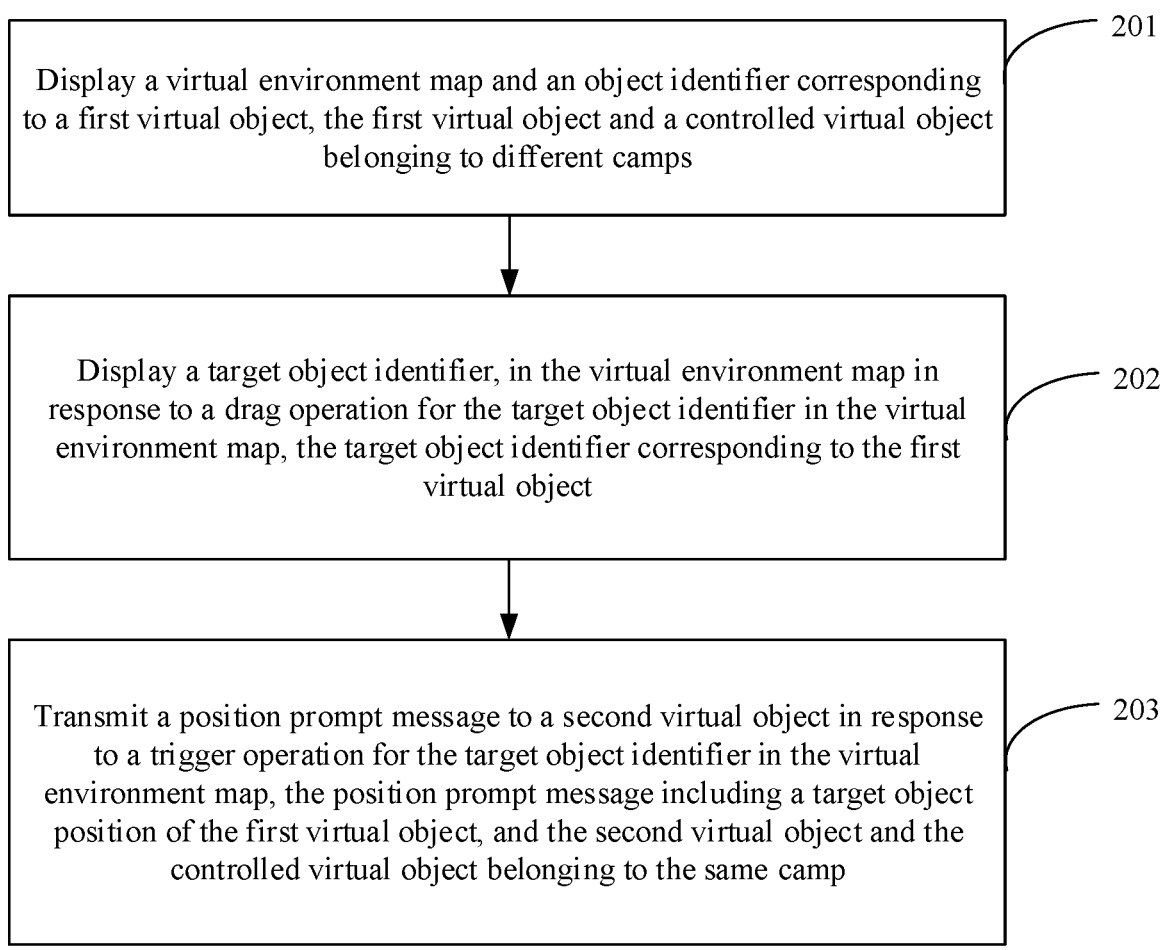
FIG. 2 is a flowchart of a position prompt method for a virtual object according to an embodiment of this application.

FIG. 2 is a flowchart of a position prompt method for a virtual object according to an embodiment of this application. This embodiment is described by using an example in which the method is applied to the first terminal 110 or the second terminal 130 in the implementation environment shown in FIG. 1 or another terminal in the implementation environment. The method includes the following steps:

Step 201: Display a virtual environment map and an object identifier corresponding to at least one first virtual object, the first virtual object and a controlled virtual object belonging to different camps.

For example, the virtual environment map is used to display a global virtual environment and positions of players in the global virtual environment. For virtual objects in the friendly camp (the camp of controlled virtual object), the virtual environment map displays positions of the virtual objects in the friendly camp; and for virtual objects in enemy camps (other camps against the friendly camp), the virtual environment map only shows positions of the virtual objects in a field of view. For example, if a certain enemy player is hidden in the grass, the virtual environment map does not display the position of the enemy player. In some embodiments, the virtual environment map further displays an attribute value (life value) of a target attribute corresponding to the virtual object, and a skill status of the virtual object.

When the enemy player is hidden in the grass or in other sheltered regions that enable the enemy player to disappear in the field of view, the virtual environment map correspondingly does not display the position of the enemy player. The embodiments of this application provide a method for effectively and accurately providing the position of an enemy virtual object in this case. By marking an object identifier of the enemy virtual object at a specified position (that is, the position of the enemy virtual object) in the virtual environment map, teammates in the friendly camp may be informed of the position of the enemy virtual object, so that the teammates in the friendly camp can learn the position of the enemy virtual object in time.

In order to facilitate the user to drag the object identifier of the enemy virtual object to the virtual environment map, when the controlled virtual object enters the game, the virtual environment map and object identifiers corresponding to first virtual objects in the enemy camp can be displayed in the current user interface. The enemy camp is different from the camp of the controlled virtual object.

In some embodiments, the virtual environment map may not be displayed at the same time as the object identifier. For example, an object identifier call-out control is displayed in the user interface. The user can click/tap the object identifier call-out control. A terminal receives the trigger operation for the object identifier call-out control, and displays the object identifier corresponding to at least one first virtual object in the user interface. In some embodiments, the virtual environment map has a zoom-in control. An object position of the first virtual object needs to be marked in the virtual environment map, and the zoom-in control usually needs to zoom in the virtual environment map. Therefore, when the user clicks/taps the zoom-in control corresponding to the virtual environment map, it indicates that the user needs to mark the position of the enemy player. When the virtual environment map is zoomed in and displayed, the object identifier of at least one first virtual object is displayed.

For example, the object identifier is an identifier that uniquely identifies the first virtual object. For example, the object identifier may be a character avatar of the first virtual object, or an object name of the first virtual object. The object identifier is not limited to this embodiment of this application.

Figure 3:
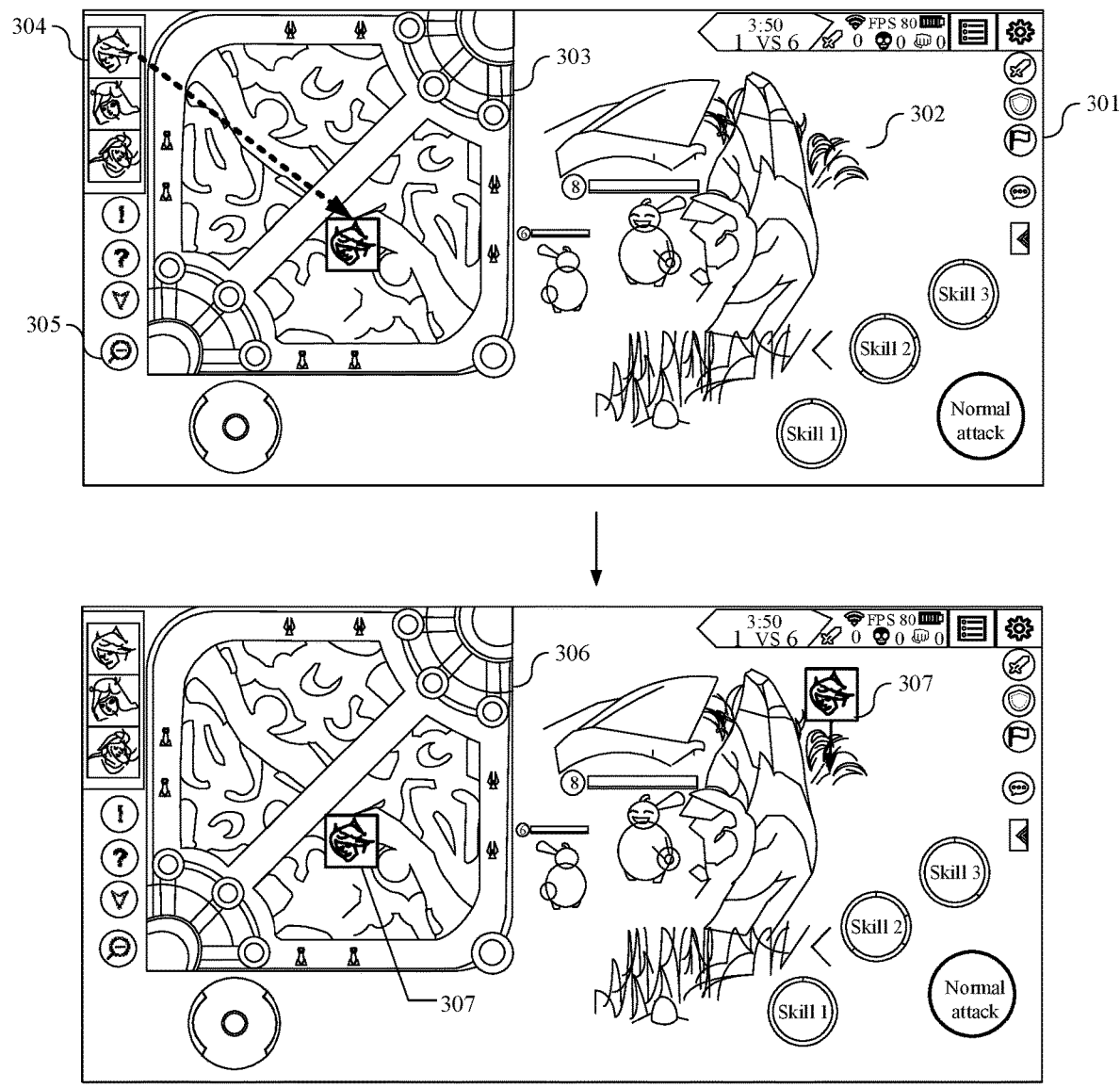
FIG. 3 is a schematic diagram of an interface of a position prompt method for a virtual object according to an embodiment of this application.

As shown in FIG. 3, user interface 301 displays a virtual environment screen 302, a virtual environment map 303, and an object identifier 304 corresponding to at least one first virtual object. In some embodiments, the user interface 301 further displays a zoom-out control 305 corresponding to the virtual environment map 303. If the user clicks/taps the zoom-out control 305, the virtual environment map can be zoomed out and displayed, and the display of the object identifier 304 corresponding to the at least one first virtual object can be canceled.

In some embodiments, the object identifier is draggable, that is, the object identifier can be dragged to the virtual environment map, and the object identifier can also be dragged in the virtual environment map.

In some embodiments, in order to facilitate dragging the object identifier to the virtual environment map, the object identifier corresponding to the at least one first virtual object can be displayed on a periphery of the virtual environment map, for example, displayed on a left side, a right side, an upper side, or a lower side of the virtual environment map, or displayed around the virtual environment map. The display position of the object identifier corresponding to at least one first virtual object is not limited in this embodiment of this application.

Step 202: Display a target object identifier in the virtual environment map in response to a drag operation for the target object identifier and a drag end point being in the virtual environment map, the target object identifier corresponding to a target virtual object.

In one embodiment, if the user needs to warn other teammates that the first virtual object (enemy virtual object) may be hidden at a certain position, the target object identifier corresponding to the first virtual object can be dragged to the virtual environment map. When the corresponding terminal receives the drag operation for the target object identifier and determines that the drag end point is in the virtual environment map, the target object identifier can be displayed in the virtual environment map, to mark the position of the target virtual object in the virtual environment map through the target object identifier, so that the terminal determines the position of the target virtual object in the virtual environment map (or virtual environment) according to the position of the target object identifier, and then notifies other teammates based on the position marked by the target object identifier, so that the teammates can accurately obtain the position of the certain first virtual object in time.

In some embodiments, during the process of the user dragging the target object identifier to transmitting the position prompt message to the teammates, the user can drag the target object identifier for multiple times to adjust the position of the target object identifier in the virtual environment map. The corresponding terminal can receive multiple drag operations, and determines the position marked by the target object identifier after the last drag operation stops as the target object position, thereby improving the accuracy of determining the target object position.

As shown in FIG. 3, if the user needs to warn the teammates that the first virtual object is in field grass 1 near a red buffer, correspondingly, the user can drag the object identifier 304 corresponding to the first virtual object to the position of the field grass 1 in the virtual environment map 303 along the direction indicated by the arrow. Correspondingly, when the terminal receives the drag operation for the object identifier 304, and the end point of the drag operation is at the position of the field grass 1, the object identifier 304 is displayed at the position of the field grass 1.

In some embodiments, during the process of the user dragging the target object identifier to the virtual environment map, the display of the target object identifier can be canceled at the original display position (the periphery of the virtual environment map) of the target object identifier. In some embodiments, during the dragging process, the display of the target object identifier can also not need to be canceled at the original display position of the target virtual object identifier, the target object identifier can be copied, and the copied target object identifier can be dragged to the virtual environment map.

Step 203: Transmit a position prompt message to at least one second virtual object in response to a trigger operation for the target object identifier in the virtual environment map, the position prompt message including a target object position of the target virtual object, the target object position being obtained by marking the target object identifier, and the second virtual object and the controlled virtual object belonging to the same camp.

Since the user may fail to locate the position of the target virtual object through a single drag operation, the position of the target object identifier may need to be adjusted in the virtual environment map multiple times. When each drag operation stops, if the target object position of the target virtual object is determined according to the position of the target object identifier, and the target object position is transmitted to the teammates, obviously, the wrong position prompt message is transmitted frequently. Therefore, in order to improve the accuracy of the transmission time of the position prompt message, in one embodiment, after the user marks the position of the target object identifier in the virtual environment map, the target object identifier in the virtual environment map can be clicked/tapped. The corresponding terminal receives the trigger operation for the target object identifier in the virtual environment map, determines that the user has marked the target object identifier, and transmits the position prompt message to at least one second virtual object based on the current position of the target object identifier in the virtual environment map, to warn the second virtual object of the target object position of the target virtual object.

Correspondingly, the terminal transmits the position prompt message to the server. The server determines the receiver of the position prompt message according to a transmitter of the position prompt message. The receiver is the terminal of each second virtual object belonging to the same camp as the transmitter. Correspondingly, the server transmits the position prompt message to each receiver; After the terminal corresponding to the receiver receives the position prompt message transmitted by the server, the target object position can be marked in the current user interface by using the target object identifier to prompt the position of the target virtual object.

In some embodiments, the possible implementation of the terminal prompting the position of the target virtual object according to the position prompt message is: displaying the target object identifier in the virtual environment map according to the target object position; and displaying the target object identifier in the virtual environment according to the target object position; or displaying the position prompt message in the user interface in the form of bullet comments. For example, the position prompt message can be "Sun xx is hidden in the field grass 1".

As shown in FIG. 3, after the terminals held by the teammates receive the position prompt message, the target object position can be marked in a virtual environment map 306 through a target object identifier 307 according to the position prompt message. In some embodiments, the target object position can also be marked in the virtual environment through the target object identifier 307.

In conclusion, in this embodiment, a function of marking the position of the target virtual object in the virtual environment map is provided. A user can drag the target object identifier to a specified position in the virtual environment map, and then transmit the position prompt message related to the target virtual object to other teammates by triggering the target object identifier, so that other teammates can obtain the target object position of the target virtual object based on the position prompt message, which enriches the way to obtaining position information of the target virtual object, and improves the effectiveness and accuracy of the obtained position message. In addition, when the virtual object adopts a hiding and guarding strategy, the position of the hidden virtual object can be marked in time, to improve the hit rate of the hidden virtual object, thereby speeding up the game process, effectively controlling the length of a single game, and reducing the processing pressure of the server.

When the target virtual object is outside the field of view, that is, the target virtual object is hidden at a position at which the field of view is blocked (such as grass), and disappears within the field of view, there is a need to mark the position of the target virtual object in the virtual environment map and notify the teammate. Therefore, in order to improve the marking efficiency of the user, in one embodiment, only the object identifier of the first virtual object outside the field of view is displayed to improve the selection efficiency of the user selecting the target object identifier for dragging.

Figure 4:
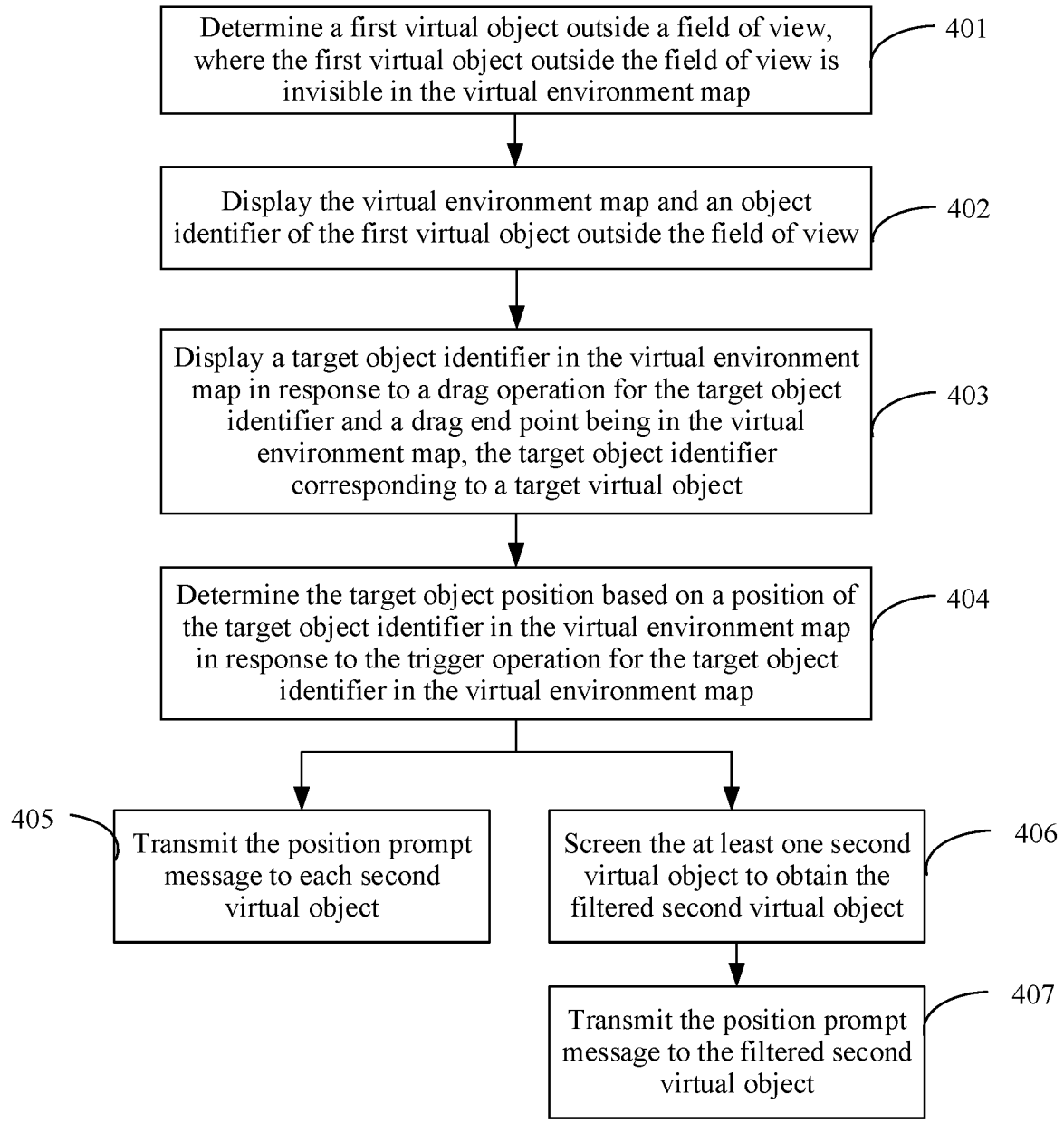
FIG. 4 is a flowchart of a position prompt method for a virtual object according to another embodiment of this application.

In one embodiment, FIG. 4 is a flowchart of a position prompt method for a virtual object according to another embodiment of this application. This embodiment is described by using an example in which the method is applied to the first terminal 110 or the second terminal 130 in the implementation environment shown in FIG. 1 or another terminal in the implementation environment. The method includes the following steps:

Step 401: Determine a first virtual object outside a field of view, where the first virtual object outside the field of view is invisible in the virtual environment map.

The position of the first virtual object outside the field of view is not displayed in the virtual environment map, and the first virtual object outside the field of view has the value of position marking. Therefore, in one embodiment, before the terminal needs to display the object identifier corresponding to at least one first virtual object, whether there is a first virtual object outside the field of view is first determined. If there is a first virtual object outside the field of view, the object identifier corresponding to the first virtual object is displayed, to warn the user of the current first virtual objects that need to be marked, and notify the teammates.

When the user estimates or sees a hidden position of a certain first virtual object, the position may be marked in the virtual environment map to notify the teammates in the friendly camp.

Step 402: Display the virtual environment map and an object identifier of the first virtual object outside the field of view.

In one embodiment, after the terminal determines the first virtual object outside the field of view, the object identifier of the first virtual object can be displayed on the periphery of the virtual environment map while the virtual environment map is displayed.

In some embodiments, in order to prevent the terminal from determining the first virtual object outside the field of view in real time and reduce the power consumption of the terminal, the first virtual object outside the field of view can be determined when the user needs to mark the virtual object position. In one embodiment, when the user needs to mark the virtual object position, the zoom-in control of the virtual environment map can be clicked/tapped. Correspondingly, the terminal receives the trigger operation for the virtual environment map, determines the first virtual object outside the field of view, and displays the object identifier corresponding to at least one first virtual object.

Figure 5:
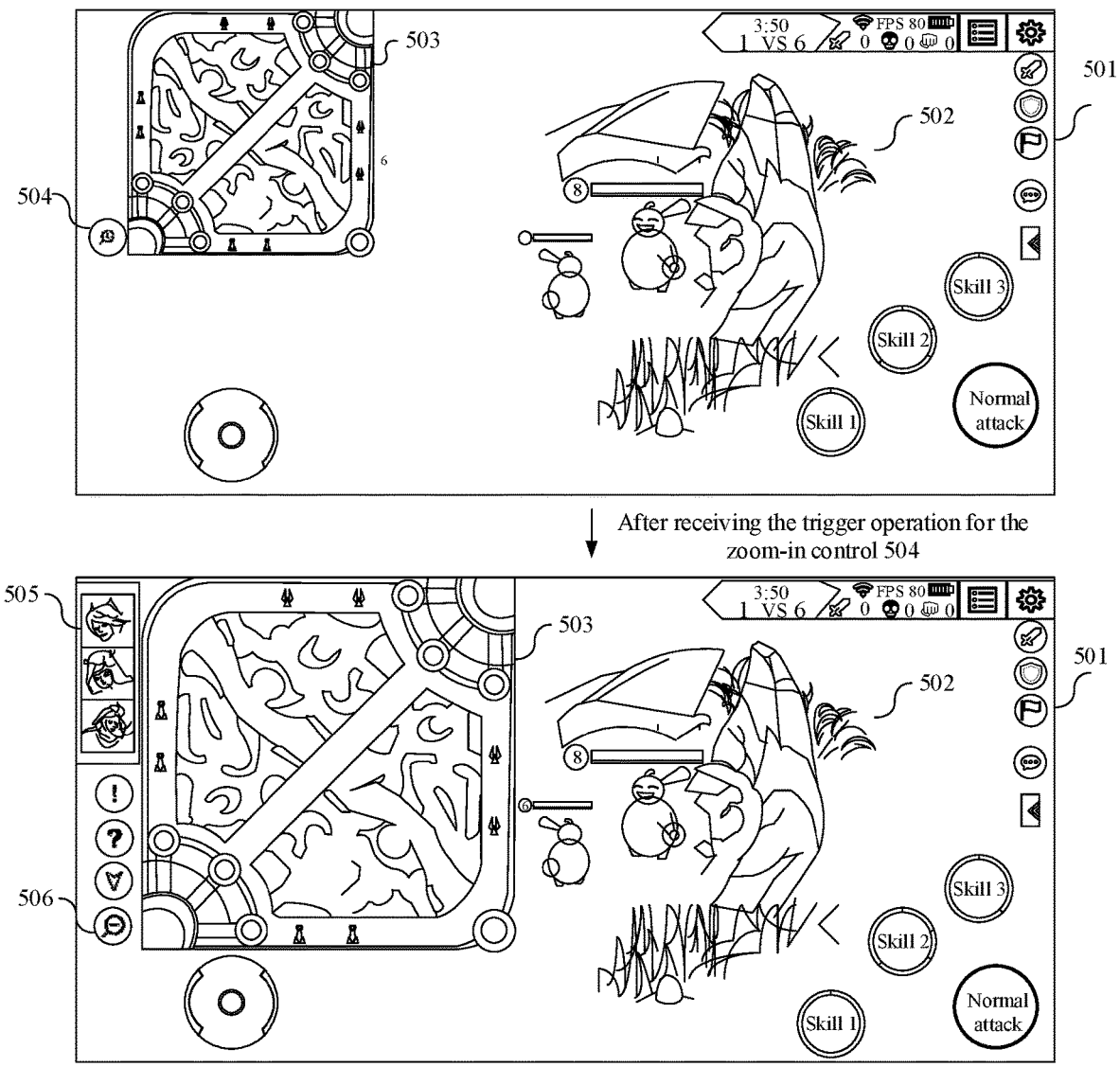
FIG. 5 is a schematic diagram of an interface of calling out to display an object identifier according to an embodiment of this application.

As shown in FIG. 5, user interface 501 displays a virtual environment screen 502, a virtual environment map 503, and a zoom-in control 504 corresponding to the virtual environment map 503. After the user clicks/taps the zoom-in control 504, the corresponding terminal receives a trigger operation for the zoom-in control 504. While zooming in to display the virtual environment map 503, an object identifier 505 corresponding to at least one first virtual object is displayed on a left side of the virtual environment map 503, and the zoom-in control 504 is switched to a zoom-out control 506.

Step 403: Display a target object identifier in the virtual environment map in response to a drag operation for the target object identifier and a drag end point being in the virtual environment map, the target object identifier corresponding to a target virtual object.

For the implementation of this step, reference may be made to step 202, and details are not described in this embodiment.

Step 404: Determine the target object position based on a position of the target object identifier in the virtual environment map in response to the trigger operation for the target object identifier in the virtual environment map.

In order to avoid transmitting wrong position prompt information to other second virtual objects frequently before the user drags the target object identifier to an accurate position, and to prevent the terminal from determining the target object position in real time according to the position of the target object identifier when each drag operation stops, in one embodiment, after the trigger operation for the target object identifier in the virtual environment map is received, which indicates that the user has marked the position of the target virtual object, the target object position is determined based on the position of the target object identifier in the virtual environment map at this time.

In order to distinguish the drag operation and the trigger operation for the target object identifier and avoid confusion, the trigger operation for the target object identifier may be a click/tap operation, a double click/tap operation, or a long press operation for the target object identifier, or other trigger operations different from the drag operation.

In some embodiments, the target object position may be a coordinate position in the virtual environment map, or a coordinate position mapped to the real virtual environment. That is, the coordinate position of the target object identifier in the virtual environment map is determined to be (x1, y1), and then the real coordinate position (x2, y2) corresponding to (x1, y1) in the real virtual environment is determined based on a position mapping relationship between the virtual environment map and the real virtual environment.

Step 405: Transmit the position prompt message to each second virtual object.

After determining the target object position of the target virtual object based on the position of the target object identifier, the terminal can transmit the position prompt message to all other second virtual objects belonging to the friendly camp, so that all teammates in the friendly camp can learn the position of the target virtual object.

In some embodiments, if the position prompt message needs to be transmitted to all the second virtual objects in the friendly camp, correspondingly, the terminal can transmit a camp identifier of the friendly camp and the position prompt message to the server together, so that the server can determine that the position prompt message needs to be transmitted to a client corresponding to the second virtual object based on the camp identifier.

Step 406: Screen at least one second virtual object to obtain the screened second virtual object.

In some embodiments, in order to reduce the processing pressure of the server, the position prompt message can be transmitted to some second virtual objects in the friendly camp, for example, some second virtual objects specified by the user.

Alternatively, when the target virtual object is hidden near the second virtual object, the target virtual object may cause damage to the second virtual object. Therefore, the position prompt message can also be transmitted to some second virtual objects close to the target virtual object according to the target object position.

In one embodiment, step 406 may further include step 406A and step 406B.

Step 406A: Determine the object distance between the each second virtual object and the target virtual object based on the target object position.

In one embodiment, the second virtual object to which the position prompt message needs to be transmitted can be screened from the friendly camp based on a distance relationship. Correspondingly, when the terminal determines the target object position of the target virtual object, the object distance between the each second virtual object and the target virtual object is calculated based on the current position of the each second virtual object in the friendly camp, and then the second virtual object that needs to be prompted for position is screened from the friendly camp based on the distance relationship.

In some embodiments, if the target object position determined by the terminal is the position coordinate of the target object identifier in the virtual environment map, correspondingly, the terminal can obtain the position coordinate of the each second virtual object in the friendly camp in the virtual environment map, and then the object distance between the each second virtual object and the target object identifier in the virtual environment map is calculated based on the position coordinate.

In some embodiments, if the target object position determined by the terminal is the position coordinate of the target virtual object in the real virtual environment, correspondingly, the terminal can obtain the position coordinate of the each second virtual object in the friendly camp in the real virtual environment, and then a candidate distance between the each second virtual object and the target virtual object in the real virtual environment is calculated based on the position coordinate.

Step 406B: Determine the second virtual object whose object distance is less than a second distance threshold as the screened second virtual object.

The second distance threshold can be set by a developer, or several distance thresholds can be provided, and then the user can customize and select the second distance threshold. In some embodiments, the second distance threshold can be set as the distance threshold in the virtual environment map, for example, the second distance threshold is 2 cm, or can be set as the distance threshold in the real virtual environment, for example, the second distance threshold is 100 m.

The second virtual object that is close to the target virtual object has a necessity of position prompt. Therefore, in one embodiment, after the terminal determines the object distance between the each second virtual object and the target virtual object, the object distance can be compared with the second distance threshold. If the object distance is less than the second distance threshold, which indicates that the second virtual object is close to the target virtual object, there is a need to warn the second virtual object and determine the second virtual object as the virtual object to which the position prompt message needs to be transmitted. Conversely, if the object distance is greater than the distance threshold, the position prompt message may not be transmitted to the second virtual object temporarily.

Step 407: Transmit the position prompt message to the screened second virtual object.

In one embodiment, after the terminal determines the screened second virtual object, the object identifier of the screened second virtual object and the position prompt message are transmitted to the server together, so that the server can determine, based on the object identifier, the second virtual object to which the position prompt message needs to be transmitted.

In this embodiment, when the object identifier of the first virtual object is displayed, only the object identifier of the first virtual object outside the field of view is displayed, which can improve the marking efficiency of the user selecting the target object identifier for dragging. In addition, when the trigger operation for the target object identifier is received, the target object position is determined based on the position of the target object identifier in the virtual environment map, which can avoid an invalid position determination operation of the terminal and an invalid position prompt message transmission operation. In addition, during transmission of the position prompt message, the position prompt message can be transmitted to some second virtual objects, which can avoid increasing the processing pressure of the server by transmitting the position prompt message to all the second virtual objects.

In the above embodiments, the target object position of the target virtual object is determined by directly using the position of the target object identifier in the virtual environment map. In other possible implementations, in order to further improve the marking accuracy of the position, the position marking control is displayed, and the user can finely adjust the position of the target virtual object to be marked by dragging the position marking control.

Figure 6:
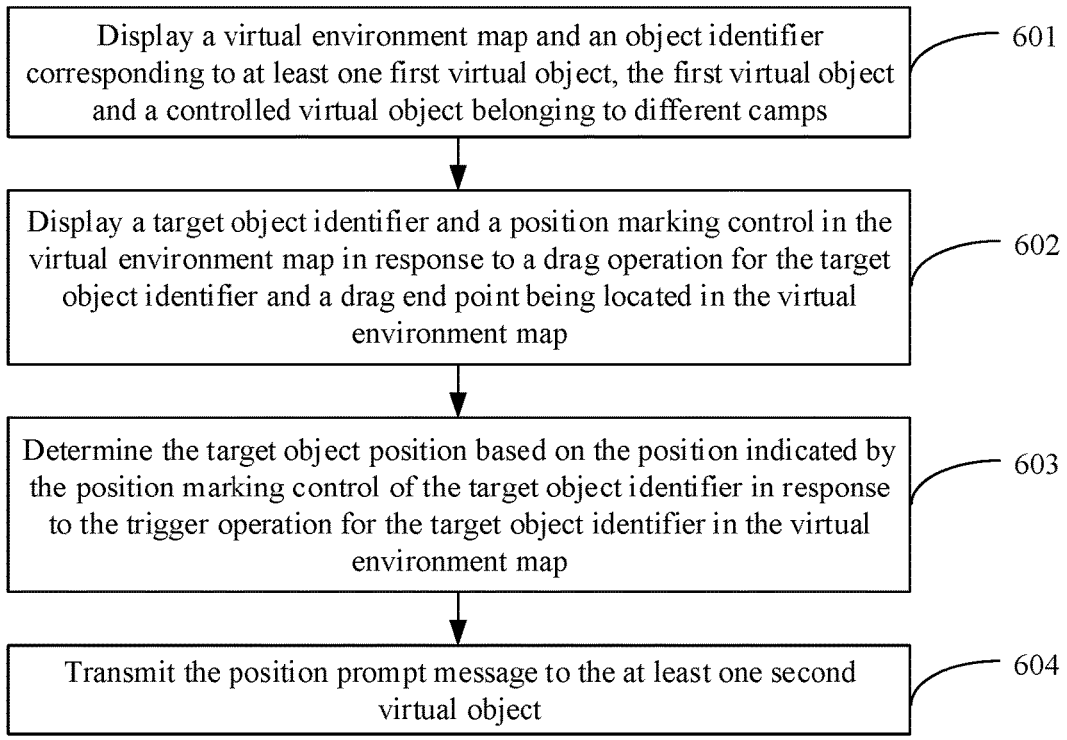
FIG. 6 is a flowchart of a position prompt method for a virtual object according to another embodiment of this application.

In one embodiment, FIG. 6 is a flowchart of a position prompt method for a virtual object according to another embodiment of this application. This embodiment is described by using an example in which the method is applied to the first terminal 110 or the second terminal 130 in the implementation environment shown in FIG. 1 or another terminal in the implementation environment. The method includes the following steps:

Step 601: Display a virtual environment map and an object identifier corresponding to at least one first virtual object, the first virtual object and a controlled virtual object belonging to different camps.

For the implementation of step 601, reference may be made to the foregoing embodiments, and details are not described again in this embodiment.

Step 602: Display a target object identifier and a position marking control in the virtual environment map in response to a drag operation for the target object identifier and a drag end point being in the virtual environment map.

The position marking control includes an object indicator and a position indicator, the target object identifier is connected to the object indicator, and the position indicator is used to indicate the target object position. For example, the position marking control can be in the form of a line segment. One end of the corresponding line segment is connected to the target object identifier, and the other end of the line segment indicates the target object position. In some embodiments, the position marking control may also be a line segment with an arrow, such as a single arrow or a double arrow. The shape of the position marking control is not limited to this embodiment of this application.

Since the position occupied by the target object identifier in the virtual environment map may be relatively large, while the virtual environment map is relatively small, if the target object position is determined based on the target object identifier, the determined target object position may be inaccurate. Therefore, in order to further improve the marking accuracy of the target object position, in one embodiment, when the user drags the target object identifier to the virtual environment map, the terminal displays the position marking control connected to the target object identifier in the virtual environment map. The user can enable the position indicator of the position marking control to accurately mark the position of the target virtual object by dragging the position marking control.

For example, taking the position marking control being a line segment as an example, the target object position of the target virtual object is marked by using one end of the line segment. The target object position indicated by using a point corresponding to one end of the line segment is more accurate than the target object position indicated by using the target object identifier.

In this embodiment, when the position marking control is displayed, the user can drag the target object identifier to a position near the target virtual object, and then accurately mark the position of the target virtual object by dragging the position marking control. Correspondingly, the terminal receives the drag operation for the position marking control, and adjusts the position indicated by the position indicator in the virtual environment map.

Figure 7:
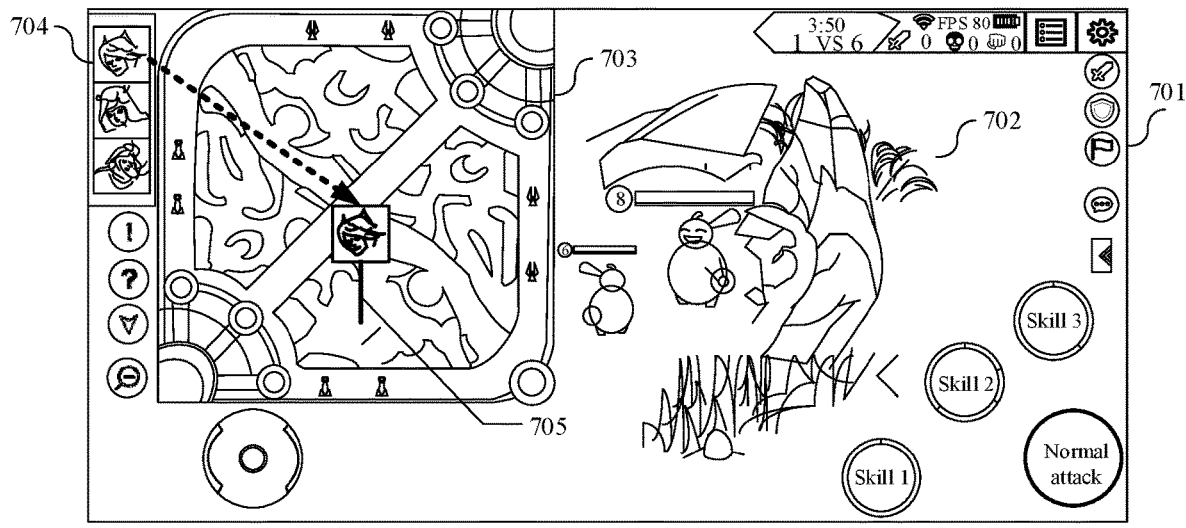
FIG. 7 is a schematic diagram of a process of marking a position of a target virtual object according to an embodiment of this application.

As shown in FIG. 7, a user interface 701 displays a virtual environment screen 702, a virtual environment map 703, and an object identifier 704 corresponding to at least one first virtual object. When the user drags the object identifier 704 to the virtual environment map 703 along the direction indicated by the arrow, the terminal receives the drag operation for the object identifier 704, the drag end point is in the virtual environment map 703, and the object identifier 704 and the position marking control 705 are displayed in the virtual environment map 703. The user can change the position indicated by the position indicator in the position marking control 705 by dragging the position marking control 705.

In one embodiment, when at least two second virtual objects are hidden at the same position, the user may drag at least two target object identifiers to the virtual environment map. If there are at least two target object identifiers in the virtual environment map, correspondingly, a display quantity of the position marking controls may be determined based on a distance relationship between the at least two target object identifiers. For example, the process of displaying the position marking control in the virtual environment map can include the following two cases.

1. A single position marking control is displayed when there are at least two target object identifiers in the virtual environment map and an identifier distance is less than a first distance threshold, where the single position marking control indicates positions of at least two target virtual objects, and the identifier distance is a distance between the at least two target object identifiers.

When at least two target virtual objects are hidden at the same position, in order to notify the teammates that at least two target virtual objects are hidden in the target position, the target object identifiers of the at least two target virtual objects need to be dragged to the virtual environment map during the position notification. Therefore, in one embodiment, when the terminal recognizes that there are at least two target object identifiers in the virtual environment map, whether the at least two target virtual objects need to be marked at the same position can be determined through the positions of the target object identifiers. If at least two target virtual objects need to be marked at the same position, a single position marking control may be only displayed, and then, the positions of at least two target virtual objects are indicated by the single position marking control.

In some embodiments, whether at least two target virtual objects need to be marked at the same position is determined through the identifier distance between the target object identifiers. When the identifier distance is less than the first distance threshold, it is determined that the target object identifiers are close to each other, and the corresponding target virtual objects may be hidden at the same position. Therefore, the single position marking control may be only displayed.

In one embodiment, in order to indicate that the target object positions marked by at least two target object identifiers are the same position, when the terminal determines that the identifier distance between the at least two target object identifiers is less than the first distance threshold, the at least two target object identifiers can be combined and displayed, and the object indicator of the single position marking control can be connected to the combined at least two target object identifiers. In some embodiments, the combined display mode can display the at least two target object identifiers in the same box, or to display the at least two target object identifiers in a special way, for example, to highlight the at least two target object identifiers and display the at least two target object identifiers in the same color. The combined display mode is not limited in this embodiment.

The first distance threshold can be set by the developer. In some embodiments, the first distance threshold can indicate a position in the virtual environment map, for example, the first distance threshold may be 2 mm, or can indicate a position in the real virtual environment, for example, the first distance threshold may be 1 m.

Figure 8:
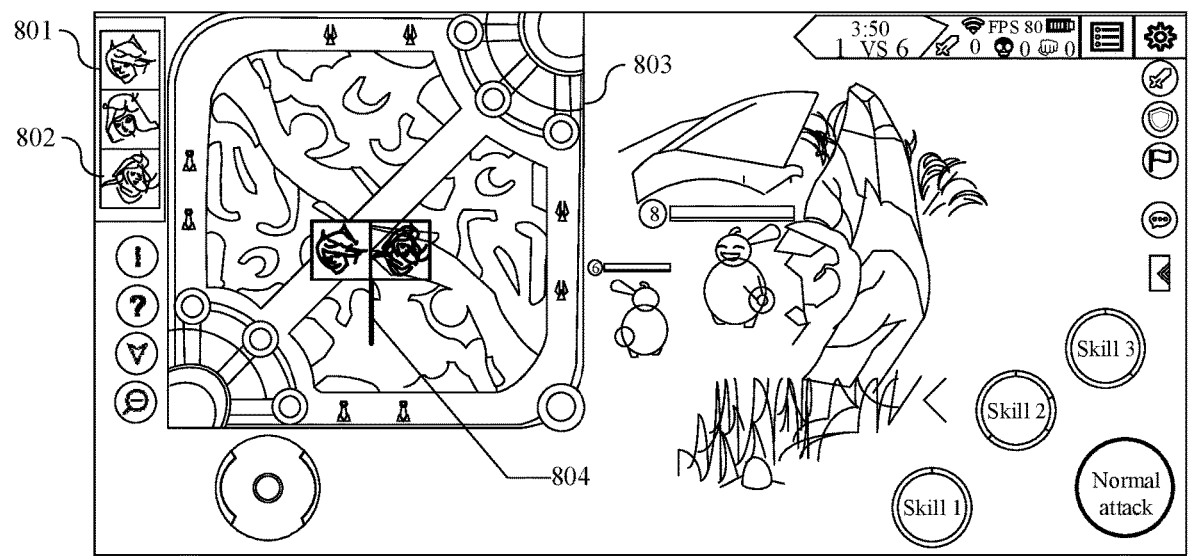
FIG. 8 is a schematic diagram of a process of marking a position of a target virtual object according to another embodiment of this application.

As shown in FIG. 8, when the user drags an object identifier 801 and an object identifier 802 to a virtual environment map 803, if the terminal detects that a distance between the object identifier 801 and the object identifier 802 is less than the first distance threshold, a single position marking control 804 is displayed.

2. The at least two position marking controls are displayed when there are at least two target object identifiers in the virtual environment map and the identifier distance is greater than the first distance threshold, where different position marking controls indicate positions of different target virtual objects.

In some embodiments, if there is an identifier distance between at least two target object identifiers that is greater than the first distance threshold, it indicates that the target virtual objects corresponding to the target object identifiers are not at the same position. Correspondingly, the position marking controls can be displayed separately for different target object identifiers, and then the positions of different target virtual objects can be marked by dragging the different position marking controls. The object indicators of the different position marking controls are connected to the different target object identifiers.

Figure 9:
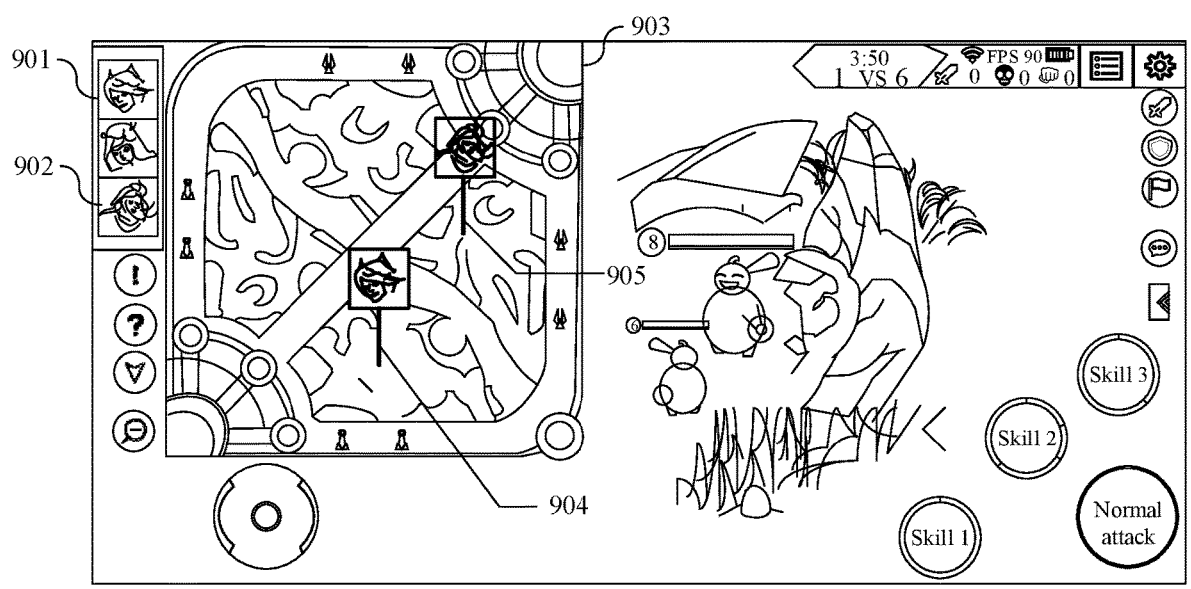
FIG. 9 is a schematic diagram of a process of marking a position of a target virtual object according to another embodiment of this application.

As shown in FIG. 9, when the user drags an object identifier 901 and an object identifier 902 to a virtual environment map 903, if the terminal detects that an identifier distance between the object identifier 901 and the object identifier 902 is greater than the first distance threshold, a first position indication control 904 corresponding to the object identifier 901 and a second position indication control 905 corresponding to the object identifier 902 are displayed.

In one embodiment, when there are at least two target object identifiers in the virtual environment map, an identifier distance between some target object identifiers is less than the first distance threshold, and an identifier distance between some target object identifiers is greater than the first distance threshold, the target object identifiers whose identifier distance is less than the first distance threshold can be combined and displayed, and a corresponding single position indication control can be displayed for the combined and displayed target object identifiers. For the target object identifiers whose identifier distance is greater than the first distance threshold, a corresponding position indication control is displayed.

For example, when the virtual environment map contains a target object identifier A, a target object identifier B, and a target object identifier C, the identifier distance between the target object identifier A and the target object identifier B is less than the first distance threshold, and the identifier distance between the target object identifier C and the target object identifier A and the identifier distance between the target object identifier C and the target object identifier B are greater than the first distance threshold, the target object identifier A and the target object identifier B can be combined and displayed, and a corresponding single position indication control A is displayed, and a corresponding position indication control B is displayed for the target object identifier C.

Step 603: Determine the target object position based on the position indicated by the position marking control of the target object identifier in response to the trigger operation for the target object identifier in the virtual environment map.

In one embodiment, when the trigger operation for the target object identifier in the virtual environment map is received, it indicates that the user has adjusted the position of the position marking control, and then can determine the target object position based on the position indicated by the position marking control corresponding to the target object identifier. Since the position indicator of the position marking control is used to indicate the target object position, during determining of the target object position, only the position corresponding to the position indicator in the position marking control needs to be obtained, that is, the target object position can be determined based on the position.

For example, if the position coordinate corresponding to the position indicator in the virtual environment map is (x3, y3), correspondingly, the position coordinate (x3, y3) can be directly determined as the target object position, or the position coordinate (x3, y3) is mapped to the real virtual environment, to obtain the position coordinate (x4, y4), and the position coordinate (x4, y4) is determined as the target object position.

Step 604: Transmit the position prompt message to at least one second virtual object.

For the implementation of step 604, reference may be made to the foregoing embodiments, and details are not described again in this embodiment.

In this embodiment, the position of the target virtual object is marked by the position indicator in the position marking control. Since the position indicator can accurately mark a pixel position, the target object position determined based on the position indicator can be accurate to a point in the virtual environment map, which improves the accuracy of determining the target object position.

In the above embodiments, the transmitter of the position prompt message is taken as an example to describe the position prompt method for a virtual object. In this embodiment, the process of position prompt based on the position prompt message after the terminal receives the position prompt message transmitted by the other second virtual object is described.

Figure 10:
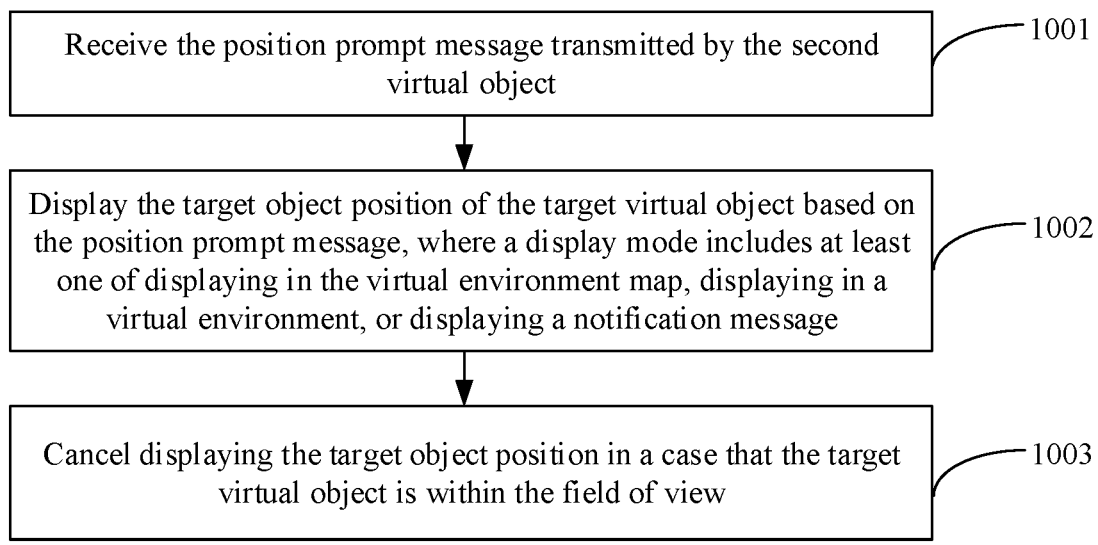
FIG. 10 is a flowchart of a position prompt method for a virtual object according to another embodiment of this application.

FIG. 10 is a flowchart of a position prompt method for a virtual object according to another embodiment of this application. This embodiment is described by using an example in which the method is applied to the first terminal 110 or the second terminal 130 in the implementation environment shown in FIG. 1 or another terminal in the implementation environment. The method includes the following steps:

Step 1001: Receive the position prompt message transmitted by the second virtual object.

The second virtual object is a virtual object belonging to the same camp as the controlled virtual object. In one embodiment, after a teammate marks a position of a certain target virtual object in the virtual environment map, the position prompt message is transmitted to the other second virtual objects in the friendly camp. Correspondingly, the position prompt message transmitted by the second virtual object is received.

For example, the position prompt message can include an object identifier of the target virtual object and a target object position. In some embodiments, the position prompt message can further include a source of the position prompt message.

Step 1002: Display the target object position of the target virtual object based on the position prompt message, where a display mode includes at least one of displaying in the virtual environment map, displaying in a virtual environment, or displaying a notification message.

In order to more accurately warn the user that a certain target virtual object is hidden at the target object position, in one embodiment, after the terminal receives the position prompt message, the target object identifier can be displayed at the target object position in the virtual environment map, or the target object identifier can be displayed at the target object position in the real virtual environment, or the notification message can be displayed on an upper layer of the current user interface, to warn the user of the target object position of the target virtual object.

The above three display modes can be displayed at the same time, or one or two of them can be displayed. This is not limited to this embodiment of this application.

In some embodiments, when the target object position is indicated in the virtual environment map and the real virtual environment, the target object identifier can be used for indication. In some embodiments, the target object identifier can be displayed respectively at the corresponding target object position in the virtual environment map and the real virtual environment, or the target object identifier with the position indication control can be displayed respectively, where the position indicator points to the target object position.

In some embodiments, when the target object identifier is displayed at the target object position, in order to prevent the user from missing the prompt, the target object identifier can be marked with a noticeable color. For example, when the target object position is marked by using the target object identifier, the position marking control can be displayed. The position marking control connects the target object identifier and the indicated target object position. For example, the color of the position marking control can adopt a noticeable color, such as red or yellow, or the target object identifier can be displayed in a flashing way to warn the user.

Figure 11:
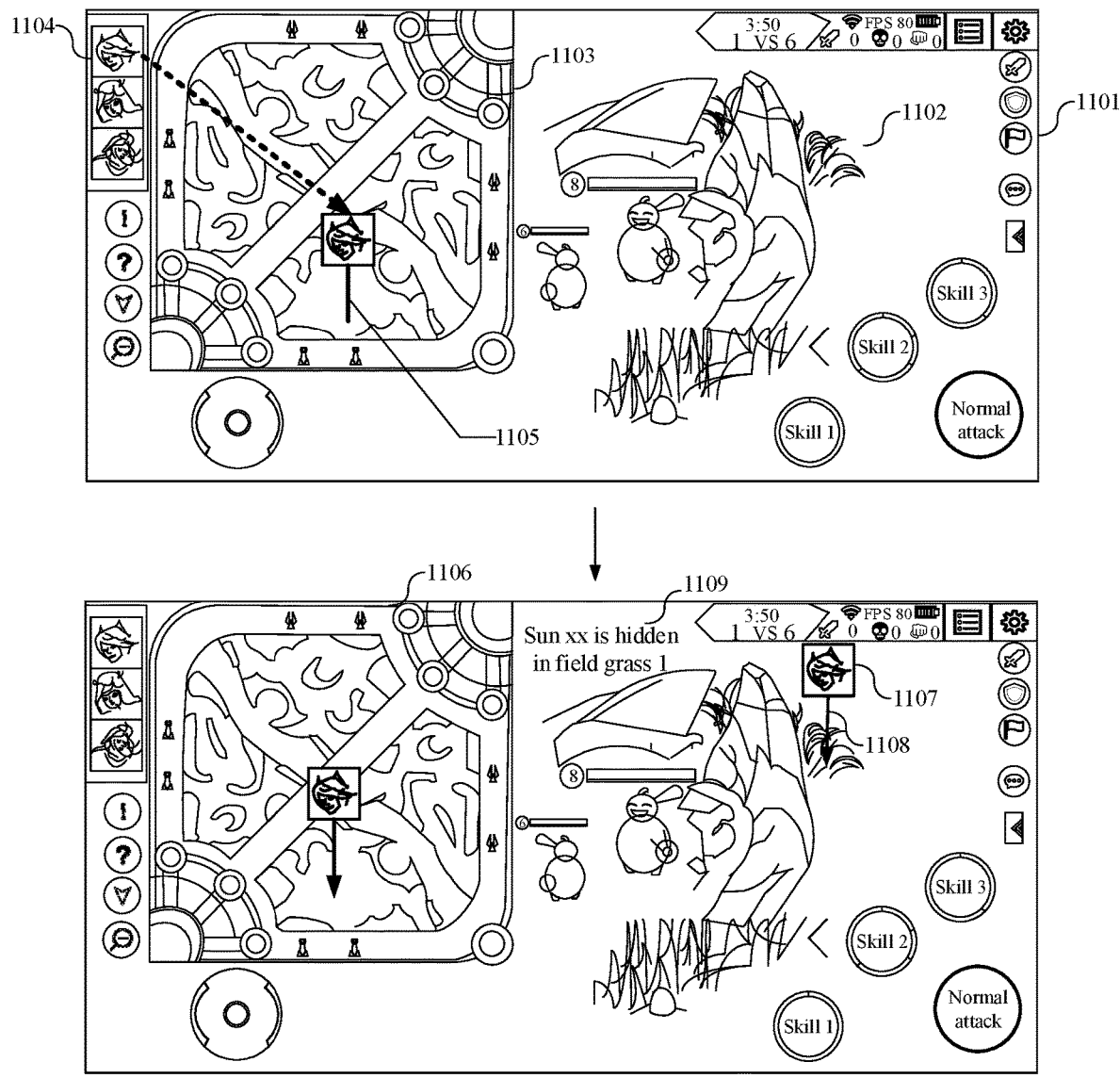
FIG. 11 is a schematic diagram of an interface of a position prompt method for a virtual object according to another embodiment of this application.

As shown in FIG. 11, a user interface 1101 displays a virtual environment screen 1102, a virtual environment map 1103, and an object identifier 1104 corresponding to at least one first virtual object. When the user drags the object identifier 1104 to the virtual environment map 1103 along the direction indicated by the arrow, the terminal receives the drag operation for the object identifier 1104, the drag end point is in the virtual environment map 1103, and the object identifier 1104 and the position marking control 1105 are displayed in the virtual environment map 1103. When the user clicks/taps the object identifier 1104 on the virtual environment map 1103, the position prompt message can be transmitted to the terminals held by the teammates. Correspondingly, when the terminals held by the teammates receive the position prompt message, the position of the target virtual object can be marked at the target object position in the virtual environment screen through a target object identifier 1107 and a position marking control 1108, or the position of the target object can be marked in a virtual environment map 1106 through the target object identifier 1107 and the position marking control 1108, or a notification message 1109 can be displayed in the current user interface.

In some embodiments, since the display screen of the terminal is limited, after the terminal receives the position prompt message, the target object position in the position prompt message may not be in the currently displayed virtual environment screen. Even if the target object position is marked in the virtual environment, it cannot play the role of position message warning. Therefore, in one embodiment, when it is determined that the target object position is in the virtual environment screen, correspondingly, the target object position of the target virtual object is displayed in the virtual environment, that is, the target object position is identified in the virtual environment through the target object. Conversely, if the target object position is not in the virtual environment screen, there is no need to display the target object position of the target virtual object in the virtual environment.

Step 1003: Cancel displaying the target object position when the target virtual object is within the field of view.

The target object position is warned because the target virtual object is outside the field of view. If the target virtual object appears within a field of view, there is no need to display the target object position.

In some embodiments, when marking of the target object position is wrong, in order to avoid the wrong prompt of the target object position, the display of the target object identifier can also be canceled after it is determined that the target object appears in the field of view.

In this embodiment, when the terminal receives the position prompt message transmitted by the other teammates, the position of the target virtual object is displayed in the virtual environment map and the virtual environment, or the notification message is displayed in the user interface, and the user is warned in time that the target virtual object may be hidden in the target object position.

Figure 12:
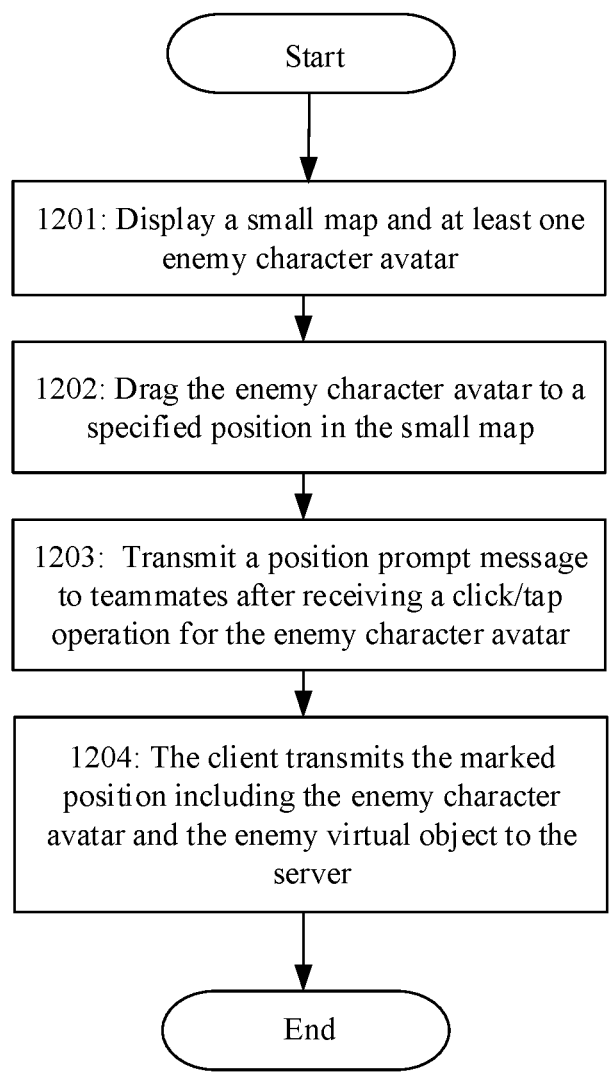
FIG. 12 is a flowchart of a position prompt method for a virtual object according to another embodiment of this application.

With reference to the foregoing embodiments, in one embodiment, a process of an initiator of a virtual object position prompt is shown in FIG. 12, and the process includes:

Step 1201: Display a small map and at least one enemy character avatar.

The small map is the virtual environment map in the above embodiments, and the enemy character avatar is the object identifier of the first virtual object.

Step 1202: Drag the enemy character avatar to a specified position on the small map.

When the user needs to mark the position of the enemy virtual object on the small map, the enemy character avatar can be dragged to the specified position on the small map. The specified position can be the position of the enemy virtual object, or near the position of the enemy virtual object, and the position of the enemy virtual object is indicated through a position marking control connected to the enemy character avatar.

Step 1203: Transmit a position message prompt to teammates after receiving a click/tap operation for the enemy character avatar.

After the user marks the position of the enemy virtual object, the enemy character avatar on the small map can be clicked/tapped, and the terminal receives the click/tap operation for the enemy character avatar on the small map, and transmits the position message prompt to the teammates based on the indicated position of the enemy virtual object.

Step 1204: The client transmits the marked position including the enemy character avatar and the enemy virtual object to the server.

The corresponding client transmits the marked position of the enemy character avatar and the enemy virtual object (that is, the position prompt message) to the server, so that the server can forward the position prompt message to the other second virtual objects in the friendly camp.

Figure 13:
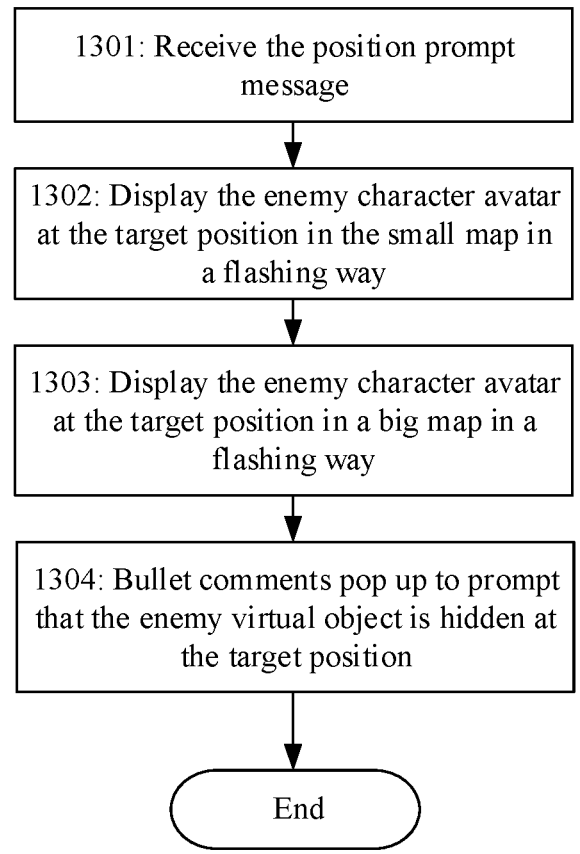
FIG. 13 is a flowchart of a position prompt method for a virtual object according to an embodiment of this application.

Correspondingly, a process of a receiver of the virtual object position prompt is shown in FIG. 13, and the process includes:

Step 1301: Receive the position prompt message.

The terminal receives the position prompt message transmitted by the other second virtual objects. The position prompt message includes an enemy virtual object identifier (such as a character avatar or a character name) and a target object position.

Step 1302: Display the enemy character avatar at the target position on the small map in a flashing way.

In the position prompt process based on the position prompt message, the enemy virtual object position (target position) can be identified on the small map through the enemy character avatar.

Step 1303: Display the enemy character avatar at the target position on a big map in a flashing way.

In some embodiments, the position of the enemy virtual object can also be identified at the target object position on the big map (virtual environment) through the enemy character avatar.

Step 1304: Bullet comments pop up to prompt that the enemy virtual object is hidden at the target position.

In some embodiments, the bullet comments including the position prompt message can also be displayed in the current user interface to warn the user of the hidden position of the enemy player.

Figure 14:
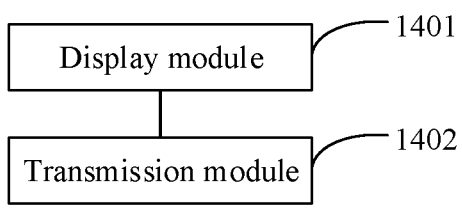
FIG. 14 is a structural block diagram of a position prompt apparatus for a virtual object according to an embodiment of this application.

FIG. 14 is a structural block diagram of a position prompt apparatus for a virtual object according to one embodiment of this application. The apparatus includes:

a display module 1401, configured to display a virtual environment map and an object identifier corresponding to at least one first virtual object, the first virtual object and a controlled virtual object belonging to different camps;

the display module 1401 being further configured to display a target object identifier in the virtual environment map in response to a drag operation for the target object identifier and a drag end point being in the virtual environment map, the target object identifier corresponding to a target virtual object; and a transmission module 1402, configured to transmit a position prompt message to at least one second virtual object, in response to a trigger operation for the target object identifier in the virtual environment map, the position prompt message including a target object position of the target virtual object, the target object position being obtained by marking the target object identifier, the second virtual object and the controlled virtual object belonging to the same camp.

In some embodiments, the transmission module 1402 is further configured to:

determine the target object position based on a position of the target object identifier in the virtual environment map in response to the trigger operation for the target object identifier in the virtual environment map; and transmit the position prompt message to the at least one second virtual object.

In some embodiments, the transmission module 1402 is further configured to:

determine the target object position based on a position indicated by a position marking control corresponding to the target object identifier in response to the trigger operation for the target object identifier in the virtual environment map, where the position marking control includes an object indicator and a position indicator, the target object identifier is connected to the object indicator, and the position indicator is used to indicate the target object position; and transmit the position prompt message to the at least one second virtual object.

In some embodiments, the display module 1401 is further configured to:

display the target object identifier and the position marking control in the virtual environment map; and the apparatus further includes:

an adjustment module, configured to adjust a position indicated by the position indicator in the virtual environment map in response to the drag operation for the position marking control.

In some embodiments, the display module 1401 is further configured to:

display a single position marking control when there are at least two target object identifiers in the virtual environment map and an identifier distance is less than a first distance threshold, where the single position marking control indicates positions of at least two target virtual objects, and the identifier distance is a distance between the at least two target object identifiers; and display the at least two position marking controls when there are at least two target object identifiers in the virtual environment map and the identifier distance is greater than the first distance threshold, where different position marking controls indicate positions of different target virtual objects.

In some embodiments, the display module 1401 is further configured to:

determine a first virtual object outside a field of view, where the first virtual object outside the field of view is invisible in the virtual environment map; and display the virtual environment map and an object identifier of the first virtual object outside the field of view.

In some embodiments, the transmission module 1402 is further configured to:

transmit the position prompt message to each second virtual object; or screen the at least one second virtual object to obtain the screened second virtual object; and transmit the position prompt message to the screened second virtual object.

In some embodiments, the transmission module 1402 is further configured to:

determine an object distance between the each second virtual object and the target virtual object based on the target object position; and determine the second virtual object whose object distance is less than a second distance threshold as the screened second virtual object.

In some embodiments, the display module 1401 is further configured to:

display the object identifier corresponding to at least one first virtual object in response to the trigger operation for the virtual environment map.

In some embodiments, the apparatus further includes:

a receiving module, configured to receive the position prompt message transmitted by the second virtual object.

The display module 1401 is further configured to display the target object position of the target virtual object based on the position prompt message, where a display mode includes at least one of displaying in the virtual environment map, displaying in a virtual environment, or displaying a notification message.

In some embodiments, the display module 1401 is further configured to:

display the target object position of the target virtual object in the virtual environment when the target object position is in the virtual environment screen.

In some embodiments, the apparatus further includes:

a display cancel module, configured to cancel displaying the target object position when the target virtual object is within the field of view.

In conclusion, in this embodiment, a function of marking the position of the target virtual object in the virtual environment map is provided. A user can drag the target object identifier to a specified position in the virtual environment map, and then transmit the position prompt message related to the target virtual object to other teammates by triggering the target object identifier, so that other teammates can obtain the target object position of the target virtual object based on the position prompt message, which enriches the way to obtaining position information of the target virtual object, and improves the effectiveness and accuracy of the obtained position message. In addition, when the virtual object adopts a hiding and guarding strategy, the position of the hidden virtual object can be marked in time, to improve the hit rate of the hidden virtual object, thereby speeding up the game process, effectively controlling the length of a single game, and reducing the processing pressure of the server.

Figure 15:
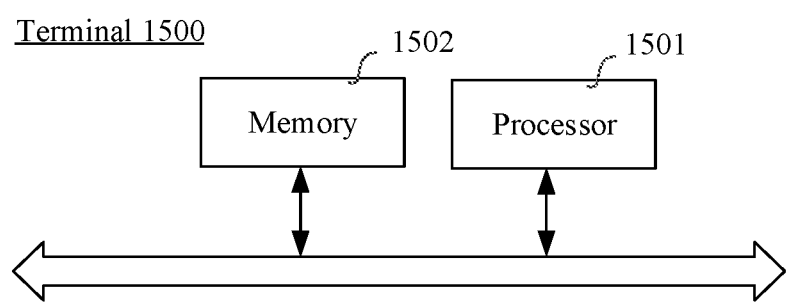
FIG. 15 is a structural block diagram of a terminal according to an embodiment of this application.

FIG. 15 is a structural block diagram of a terminal 1500 according to one embodiment of this application. The terminal 1500 may be a portable mobile terminal, such as a smartphone, a tablet computer, an MP3 player, and an MP4 player. The terminal 1500 may be further referred to as other names such as user equipment and a portable terminal.

Generally, the terminal 1500 includes: a processor 1501 and a memory 1502.

The processor 1501 may include one or more processing cores, such as a 4-core processor or an 8-core processor. The processor 1501 may be implemented by using at least one hardware form of digital signal processing (DSP), a field-programmable gate array (FPGA), or a programmable logic array (PLA). The processor 1501 may further include a main processor and a coprocessor. The main processor is configured to process data in an active state, also referred to as a central processing unit (CPU). The coprocessor is a low-power consumption processor configured to process data in a standby state. In some embodiments, processor 1501 may be integrated with a Graphics Processing Unit (GPU), which is responsible for rendering and drawing a content required to be displayed by a display screen. In some embodiments, processor 1501 may further include an Artificial Intelligence (AI) processor, which is configured to process a machine learning related computing operation.

Memory 1502 may include one or more computer-readable storage media. The computer-readable storage medium may be tangible and non-transient. Memory 1502 may also include a high-speed random access memory, as well as non-volatile memory, such as one or more disk storage devices and flash storage devices. In some embodiments, the non-transitory computer-readable storage medium in the memory 1502 is configured to store at least one instruction, the at least one instruction being configured to be executed by the processor 1501 to implement the position prompt method for a virtual object provided in the embodiments of this application.

A person skilled in the art may understand that the structure shown in FIG. 15 constitutes no limitation on the terminal 1500, and the terminal may include more or fewer components than those shown in the figure, or some components may be combined, or a different component deployment may be used.

An embodiment of this application further provides a computer-readable storage medium, storing at least one program, the at least one program being loaded and executed by a processor to implement the position prompt method for a virtual object described in the foregoing embodiments.

According to an aspect of this application, a computer program product or a computer program is provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the position prompt method for a virtual object provided in the implementations of the foregoing aspect.

What is claimed is:

1. A position prompt method for a virtual object, performed by a terminal controlling a controlled virtual object, the method comprising:
   displaying a virtual environment map and an object identifier corresponding to a first virtual object, the first virtual object and the controlled virtual object belonging to different camps;
   in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

2. The method according to claim 1, wherein the virtual environment map is a mini-map of a mobile game.

3. The method according to claim 1, wherein the mobile game is a Multiplayer Online Battle Arena game.

4. The method according to claim 1, wherein the transmitting a position prompt message to a second virtual object comprises:
   determining the target object position based on a position indicated by a position marking control in the virtual environment map, wherein the position marking control is attached to the target object identifier and comprises an elongated portion; and
   transmitting the position prompt message to the second virtual object.

5. The method according to claim 1, wherein the transmitting a position prompt message to the second virtual object comprises:
   identifying the second virtual object based on its distance from the target object position.

6. The method according to claim 1, wherein the method further comprises:
   receiving a position prompt message transmitted from the second virtual object; and
   marking the target object position of the first virtual object based on the position prompt message according to a mark mode, the mark mode comprising at least one of marking the target object position in the virtual environment map, or marking the target object position in a virtual environment corresponding to the virtual environment map.

7. The method according to claim 6 further comprising:
   displaying the marked target object position in the virtual environment when the marked object position is within a displayed portion of the virtual environment.

8. The method according to claim 6, further comprising:
   canceling marking the target object position when the first virtual object enters a field of view of the controlled virtual character.

9. A position prompt apparatus for a virtual object, the apparatus comprising one or more processors and a memory, the memory storing at least one program, the at least one program being loaded and executed by the one or more processors to implement a position prompt method for a virtual object, the one or more processors controlling a controlled virtual object, the method comprising:
   displaying a virtual environment map and an object identifier corresponding to a first virtual object, the first virtual object and the controlled virtual object belonging to different camps; and
   in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

10. The position prompt apparatus according to claim 9, wherein the virtual environment map is a mini-map of a mobile game.

11. The position prompt apparatus according to claim 9, wherein the mobile game is a Multiplayer Online Battle Arena game.

12. The position prompt apparatus according to claim 9, wherein the transmitting a position prompt message to a second virtual object comprises:
   determining the target object position based on a position indicated by a position marking control in the virtual environment map, wherein the position marking control is attached to the target object identifier and comprises an elongated portion; and
   transmitting the position prompt message to the second virtual object.

13. The position prompt apparatus according to claim 9, wherein the transmitting a position prompt message to the second virtual object comprises:
   identifying the second virtual object based on its distance from the target object position.

14. The position prompt apparatus according to claim 9, wherein the method further comprises:
   receiving a position prompt message transmitted from the second virtual object; and
   marking the target object position of the first virtual object based on the position prompt message according to a mark mode, the mark mode comprising at least one of marking the target object position in the virtual environment map, or marking the target object position in a virtual environment corresponding to the virtual environment map.

15. A non-transitory computer-readable storage medium, storing at least one program, the at least one program being loaded and executed by one or more processors to implement a position prompt method for a virtual object, the one more processors controlling a controlled virtual object, the method comprising:
   displaying a virtual environment map and an object identifier corresponding to a first virtual object, the first virtual object and the controlled virtual object belonging to different camps; and
   in response to a drag operation on the object identifier onto the virtual environment map, transmitting a position prompt message to a second virtual object, the position prompt message comprising a target object position associated with the first virtual object, the target object position corresponding to an ending position of the drag operation on the virtual environment map, and the second virtual object and the controlled virtual object belonging to the same camp.

16. The non-transitory computer-readable storage medium according to claim 15, wherein the virtual environment map is a mini-map of a mobile game.

17. The non-transitory computer-readable storage medium according to claim 15, wherein the transmitting a position prompt message to the second virtual object comprises:
   identifying the second virtual object based on its distance from the target object position.

18. The non-transitory computer-readable storage medium according to claim 15, wherein the method further comprises:
   receiving a position prompt message transmitted from the second virtual object; and
   marking the target object position of the first virtual object based on the position prompt message according to a mark mode, the mark mode comprising at least one of marking the target object position in the virtual environment map, or marking the target object position in a virtual environment corresponding to the virtual environment map.

19. The non-transitory computer-readable storage medium according to claim 18 further comprising:
   displaying the marked target object position in the virtual environment when the marked object position is within a displayed portion of the virtual environment.

20. The non-transitory computer-readable storage medium according to claim 18, further comprising:
   canceling marking the target object position when the first virtual object enters a field of view of the controlled virtual character.

\* \* \* \* \*